J. KENNEDY.
SPRING TOGGLE BOLT.
APPLICATION FILED MAY 8, 1919.
1,370,319.
Patented Mar. 1, 1921.
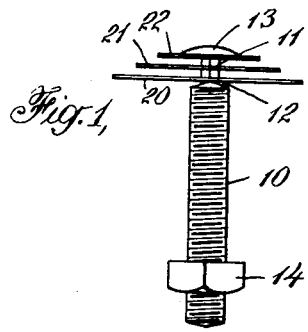
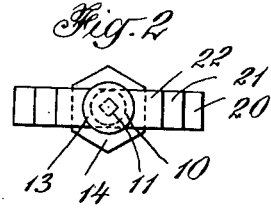
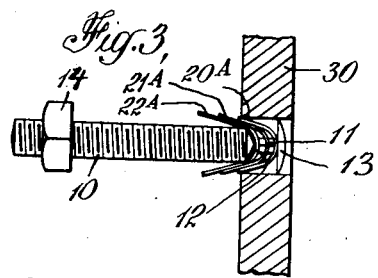
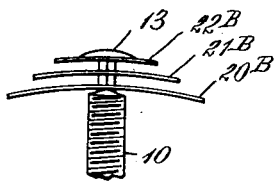
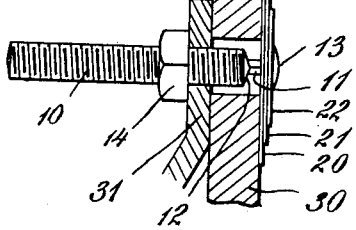
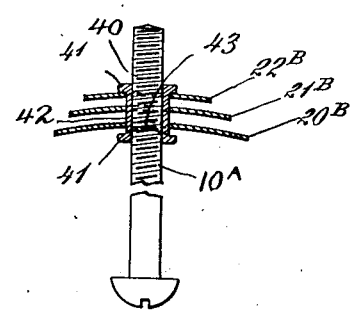
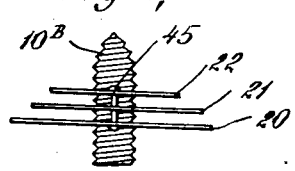
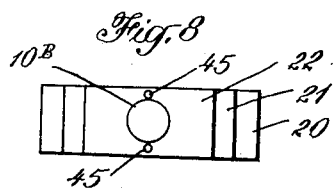
INVENTOR
Joseph Kennedy
BY
E. W. Marshall
ATTORNEY

UNITED STATES PATENT OFFICE.

JOSEPH KENNEDY, OF RICHMOND HILL, NEW YORK, ASSIGNOR TO J. EDWARD OGDEN, OF MOUNTAINVILLE, NEW YORK.

SPRING TOGGLE-BOLT.

1,370,319.

Specification of Letters Patent.     Patented Mar. 1, 1921.

Application filed May 8, 1919. Serial No. 295,588.

*To all whom it may concern:*

Be it known that I, JOSEPH KENNEDY, a citizen of the United States, and a resident of Richmond Hill, Queens county and State of New York, have invented certain new and useful Improvements in Spring Toggle-Bolts, of which the following is a specification.

My invention relates to that type of fastening devices which are known in the trade as toggle bolts, and its object is to provide a device of this character which is of simple and inexpensive construction, easy to manipulate and capable of forming a firm and secure fastening to a wall or other desired structure.

These and other objects of the invention will appear in the following specification in which the invention will be described and the novel features thereof set forth in the appended claims.

Referring to the drawings:

Figure 1 is an elevation partly in section of a toggle bolt which is made according to and embodies this invention.

Fig. 2 is an end view of the same device.

Fig. 3 is a sectional elevation of a part of a wall or the like with a toggle bolt like that shown in the preceding figures, being thrust through a hole in the wall.

Fig. 4 is a view similar to that of Fig. 3 with the device in its holding position and with a part of a member shown in section, secured to the wall thereby.

Fig. 5 is an elevation of one end of a toggle bolt of slightly different construction.

Fig. 6 is an elevation, partly in section of a device of modified construction which also embodies this invention.

Fig. 7 is an elevation of a part of a screw with a holding device thereon which is another embodiment of this invention.

Fig. 8 is an end view of the parts shown in Fig. 7.

Like characters of reference designate corresponding parts in all of the figures.

10 designates the threaded shank of the bolt and 11 an extension thereof of smaller transverse dimension and in this particular case, of square cross-section. A shoulder 12 is formed between the end of the shank and the extension and if desired this may be beveled, as shown, but this is not necessary. 13 is an enlarged head at the end of the extension, of somewhat larger diameter than that of the shank and 14 is a nut on the shank 10.

The head 13 is spaced from the shoulder 12 formed between the end of the shank 10 and the extension 11 and in this space are three flat leaf springs 20, 21 and 22, preferably of like width, but of unequal lengths, the longest one being nearest the shank 10 and the shortest one nearest the head 12. There are holes through the centers of these springs through which the extension 11 passes, and these holes are square when the extension is square, or in any case are of such shape in relation to that of the extension that rotation of the springs on the shank is prevented.

As shown, the combined thickness of the springs is less than the length of the extension, which I believe to be a preferred but not a necessary arrangement. In such a case the springs fit somewhat loosely on the extension so that they may have a limited axial movement on the extension.

The operation of this device may be seen by referring to Figs. 3 and 4. When the device is thrust through an orifice in the wall 30 the springs will be bent or bowed as shown at 20$^A$, 21$^A$ and 22$^A$ in Fig. 3 to such an extent as to pass through the hole B. If desired the holes through the springs may be somewhat longer than they are wide so that the springs will not bind on or grip the extension during this part of the operation. When the shoulder is beveled its shape aids in starting this bending of the springs.

If desired the springs may be curved as shown at 20$^B$, 21$^B$ and 22$^B$ in Fig. 5 to facilitate this part of the operation.

As soon as the springs have passed through the hole they straighten out, after which the bolt is retracted but will not come out of the hole, as the long spring will flatten out against the inner surface of the wall and will be backed by the other springs in a manner which prevents the springs bending in the opposite direction. The head 13 may be of a diameter but slightly less than that of the hole in the wall and the width of the springs the same as the diameter of the head. Then a member 31 may be placed over the shank 10 and the nut 14 tightened up against it thereby securing the member 31 to the wall 30.

It is not necessary to have the springs connected with the shank, and in Fig. 6 I have shown an arrangement in which they are connected loosely with the member which is threaded on the shank. In this figure, 10^A is a round headed screw and 40 is an internally threaded member thereon having spaced circular flanges 41 and an intermediate part 42 which is square in cross-section or of other than circular form. In this case the lower flange may if desired have a transverse raised portion 43 in the center thereof to facilitate the operation. In this case the springs 20, 21 and 22 are between the flanges 41 and the operation of inserting them through a hole in a wall is similar to that previously described.

Or, as shown in Figs. 7 and 8 the springs 20, 21 and 22 may be provided with circular orifices smaller than the outside diameter of the threads of the screw and engaged directly by the threads of a screw 10^B. The springs in this case are held in parallelism by rivets 45 which may be long enough to allow for some separation of the springs.

Variations in the construction and arrangement of the parts may be made within the spirit and scope of this invention and I intend no limitations other than those imposed by the appended claims.

What I claim is:

1. A toggle bolt comprising a shank and a plurality of leaf springs having a greater length than width supported on the shank and disposed transversely in relation to said shank.

2. A toggle bolt comprising a shank, a plurality of leaf springs each having a greater length than width supported on the shank and disposed transversely in relation to said shank, and means for holding said springs parallel with one another.

3. A toggle bolt comprising a shank, a plurality of leaf springs of different lengths each having a greater length than width supported on the shank and disposed transversely in relation to said shank, and means for holding said springs parallel with one another.

4. A toggle bolt comprising a threaded shank, and a plurality of leaf springs of progressively different lengths each having a greater length than width, movably positioned thereon and disposed transversely in relation to said shank.

5. A toggle bolt comprising a threaded shank, a plurality of leaf springs of progressively different lengths each having a greater length than width, movably positioned thereon and disposed transversely in relation to said shank, and means for holding said springs in parallelism.

6. A toggle bolt comprising a threaded shank, a plurality of leaf springs of different lengths decreasing toward the end of the device each having a greater length than width connected therewith and disposed transversely in relation to said shank, means for holding said springs parallel with one another, and a nut on said shank.

7. A toggle bolt comprising a shank, an extension thereof, a shoulder formed at the junction of the shank and the extension, an enlarged head at the end of the extension, and a leaf spring having a greater length than width between said shoulder and head and disposed transversely in relation to said shank.

8. A toggle bolt comprising a shank, an extension thereof, a shoulder formed at the junction of the shank and the extension, an enlarged head of greater diameter than that of the shank at the end of the extension, and a leaf spring having a greater length than width between said shoulder and head and disposed transversely in relation to said shank.

9. A toggle bolt comprising a shank, an extension thereof, a beveled shoulder formed at the junction of the shank and the extension, an enlarged head of greater diameter than that of the shank at the end of the extension, and a leaf spring having a greater length than width between said shoulder and head and disposed transversely in relation to said shank.

10. A toggle bolt comprising a shank, an extension thereof of other than circular cross-section, a shoulder formed at the junction of the shank and the extension, an enlarged head at the end of the extension, and a plurality of leaf springs of different lengths decreasing toward said head, each constructed to form an orifice of the shape of said extension, and each having a greater length than width between said shoulder and head and disposed transversely in relation to said shank.

11. A toggle bolt comprising a shank, an extension thereof of other than circular cross-section, a shoulder formed at the junction of the shank and the extension, an enlarged head at the end of the extension, and a plurality of leaf springs of different lengths decreasing toward said head, each constructed to form an orifice of the shape of said extension, and each having a greater length than width between said shoulder and head and disposed transversely in relation to said shank, the space between the shoulder and head being greater than the combined thickness of the springs.

12. A toggle bolt comprising a threaded shank, an extension thereof of other than circular cross-section, a beveled shoulder formed at the junction of the shank and the extension, an enlarged head at the end of the extension, and a plurality of leaf springs of different lengths decreasing toward said head, each constructed to form an orifice of the shape of said extension, and each having a greater length than width between said shoulder and head and disposed transversely in relation to said shank, and a nut in said shank.

13. A toggle bolt comprising a threaded shank, an extension thereof of other than circular cross-section, a beveled shoulder formed at the junction of the shank and the extension, an enlarged head at the end of the extension, and a plurality of curved leaf springs of different lengths decreasing toward said head, each constructed to form an orifice of the shape of said extension, and each having a greater length than width between said shoulder and head and disposed transversely in relation to said shank, and a nut on said shank.

In witness whereof I have hereunto set my hand this 24th day of April, 1919.

JOSEPH KENNEDY.

Witness:
I. B. MOORE.